(12) United States Patent  
Stojkovic et al.

(10) Patent No.: US 9,758,107 B2
(45) Date of Patent: Sep. 12, 2017

(54) ADJUSTABLE SUPPORT FOR A VEHICLE

(71) Applicant: FORD GLOBAL TECHNOLOGIES, LLC, Dearborn, MI (US)

(72) Inventors: Dragan B. Stojkovic, Taylor, MI (US); Vincent Anthony Chimento, Plymouth, MI (US); Joshua Robert Hemphill, White Lake, MI (US); Kevin Michael O'Callaghan, Trenton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/995,895

(22) Filed: Jan. 14, 2016

(65) Prior Publication Data
US 2017/0203701 A1 Jul. 20, 2017

(51) Int. Cl.
*B60R 11/00* (2006.01)
*B62D 33/027* (2006.01)

(52) U.S. Cl.
CPC .......... *B60R 11/00* (2013.01); *B62D 33/0273* (2013.01); *B60R 2011/004* (2013.01); *B60R 2011/0071* (2013.01); *B60R 2011/0082* (2013.01)

(58) Field of Classification Search
CPC ............... B60R 11/00; B60R 2011/004; B60R 2011/0071; B60R 2011/0082; B62D 33/0273; E05Y 2900/544; E05Y 2900/546
See application file for complete search history.

(56) References Cited

U.S. PATENT DOCUMENTS

| 4,867,499 A * | 9/1989 | Stephan | B62D 35/001 |
| | | | 296/180.1 |
| 5,332,185 A | 7/1994 | Walker, III | |
| 5,933,999 A | 8/1999 | McClure et al. | |
| 6,045,172 A * | 4/2000 | Thomas | B62D 33/0273 |
| | | | 108/44 |
| 6,056,175 A * | 5/2000 | Mieglitz | B60K 37/04 |
| | | | 224/282 |
| 6,364,392 B1 * | 4/2002 | Meinke | B60P 3/40 |
| | | | 296/26.1 |
| 6,454,338 B1 * | 9/2002 | Glickman | B60P 1/435 |
| | | | 296/26.1 |
| 6,588,822 B1 | 7/2003 | Duvall, Jr. | |
| 6,662,983 B2 * | 12/2003 | Lane | B60R 9/06 |
| | | | 108/44 |
| 6,678,991 B2 | 1/2004 | Hooks et al. | |

(Continued)

FOREIGN PATENT DOCUMENTS

| CA | 2378836 A1 * | 10/2002 | ............. B60P 1/435 |
| FR | 2963295 A1 * | 2/2012 | ............. B60R 5/04 |

*Primary Examiner* — Glenn Dayoan
*Assistant Examiner* — Paul Chenevert
(74) *Attorney, Agent, or Firm* — Jason C. Rogers; King & Schickli, PLLC

(57) ABSTRACT

A vehicle cover, such as a tailgate adapted for being raised and lowered relative to the vehicle or a vehicle bumper, includes an adjustable support for supporting an object, such as a gun or fishing pole. In one embodiment, the tailgate includes a recess adapted for receiving the support in an inactive condition. The support has an active condition projecting from the recess for engaging and supporting the object. The support is actuated in various manners.

20 Claims, 7 Drawing Sheets

(56) References Cited

U.S. PATENT DOCUMENTS

Figure 1:
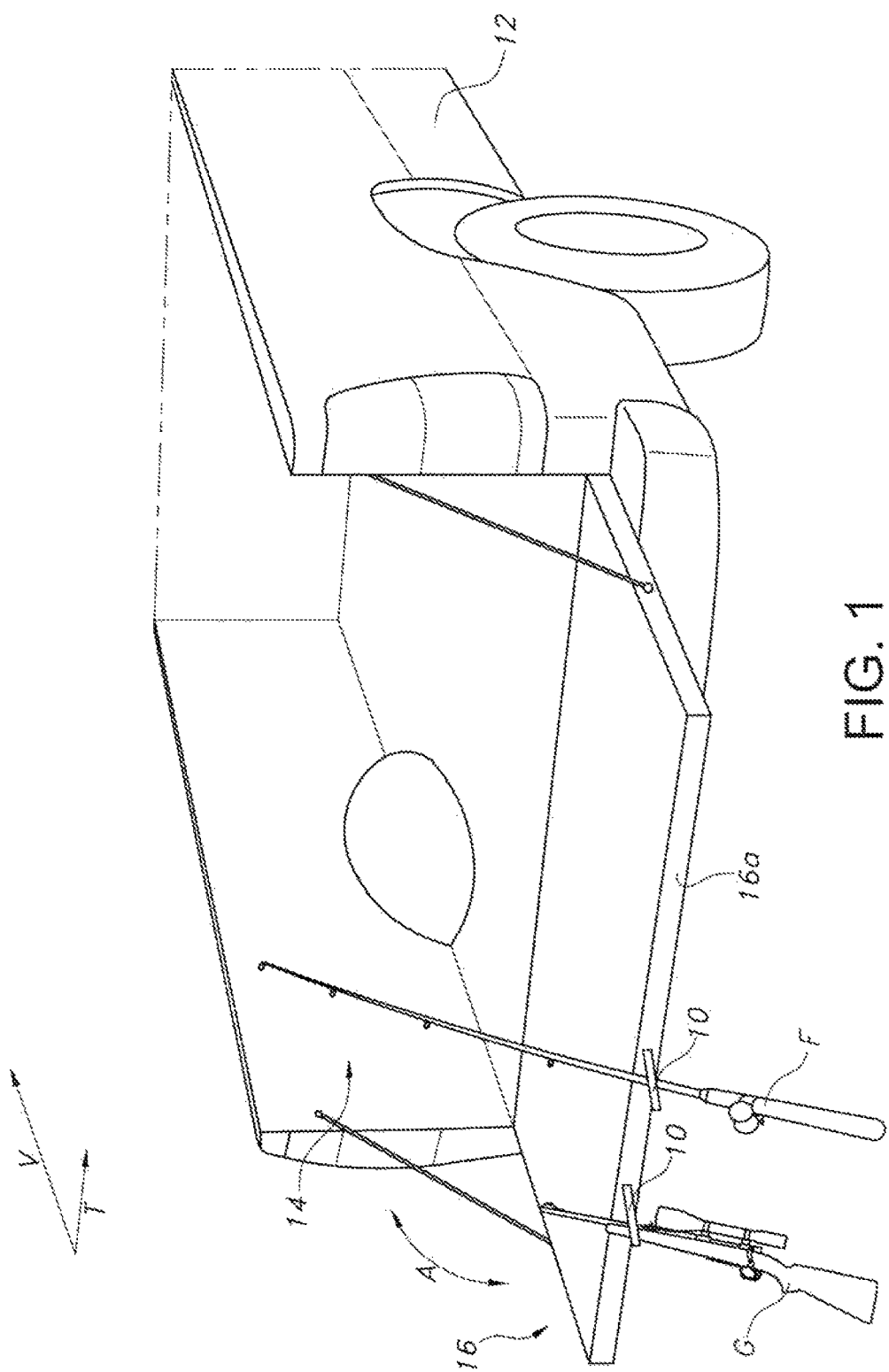
Figure 4:
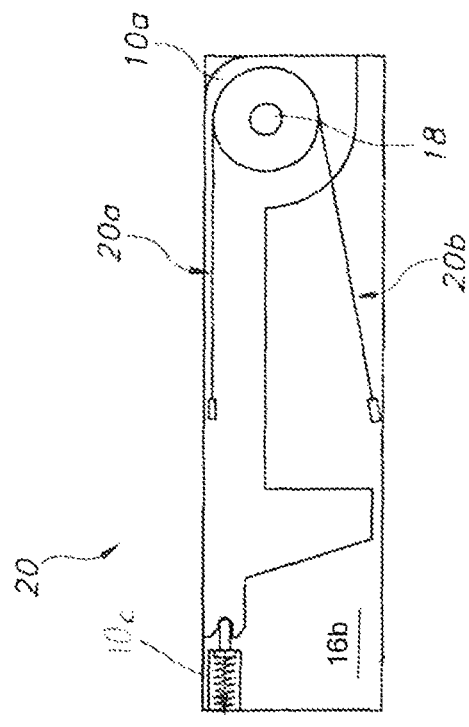
Figure 5:
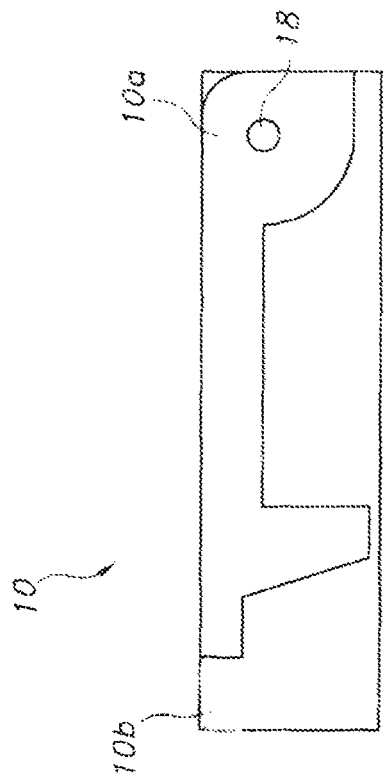
Figure 6:
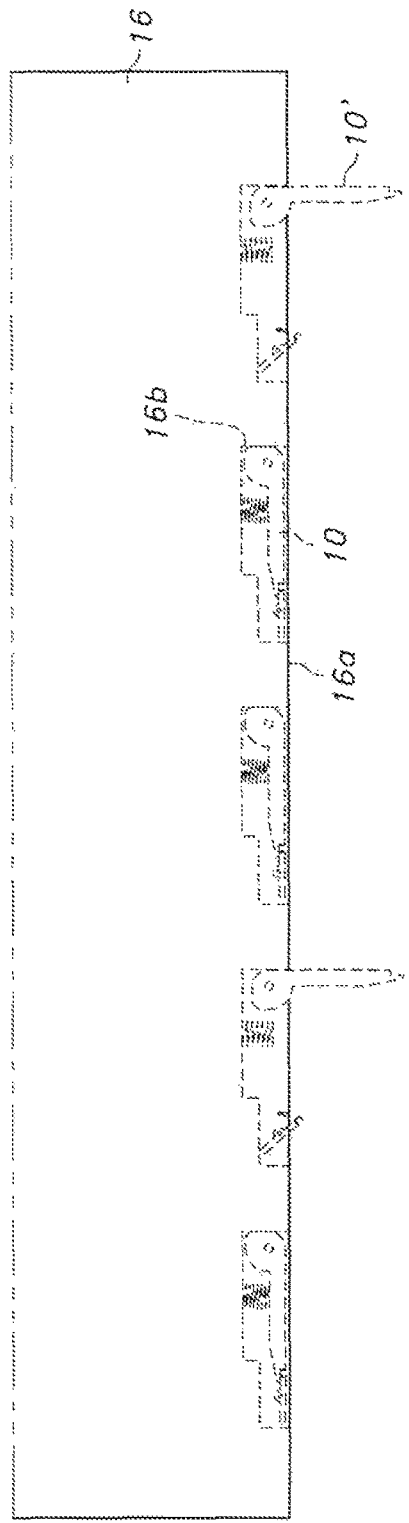
Figure 7:
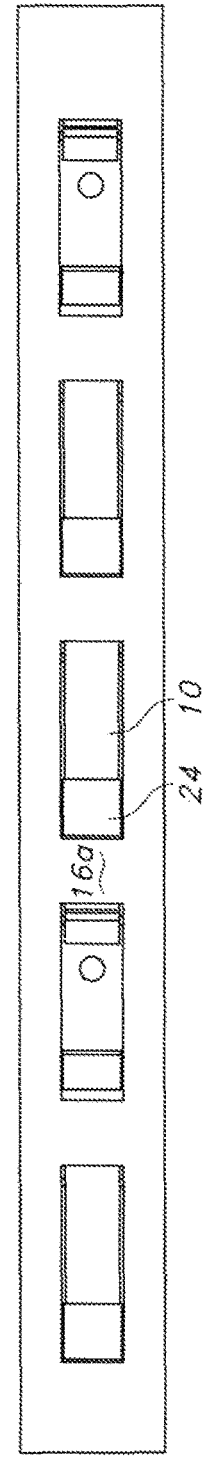
Figure 8:
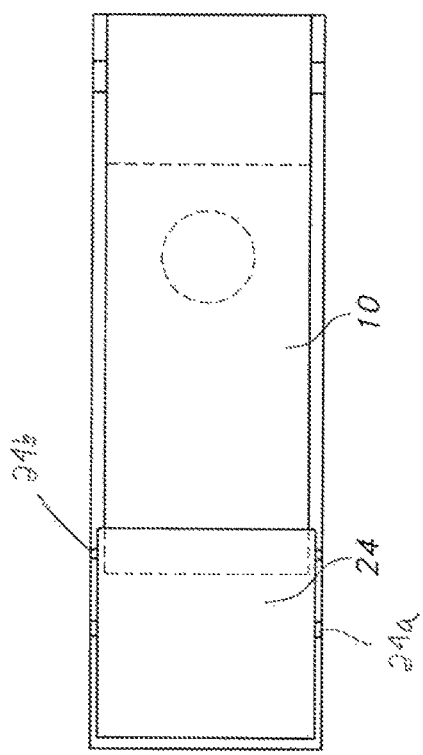
Figure 9:
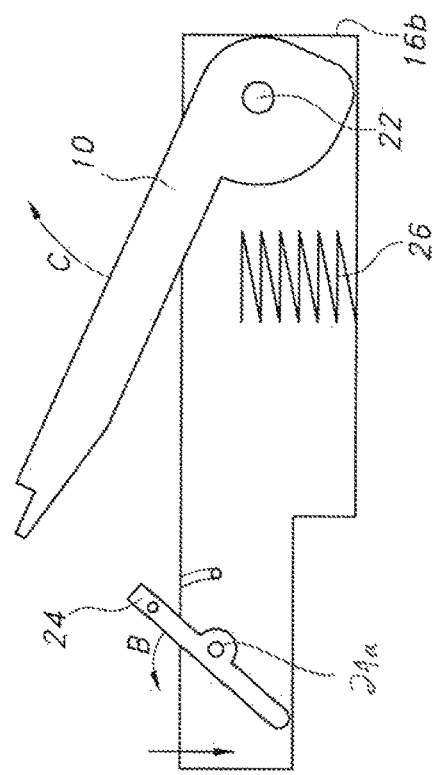

| | | | |
|---|---|---|---|
| 6,695,183 B2* | 2/2004 | Hancock | B60R 11/00 211/64 |
| 6,742,973 B1 | 6/2004 | Hendrix et al. | |
| 6,789,833 B1* | 9/2004 | Alber | B60R 13/00 292/125 |
| 6,793,184 B2 | 9/2004 | Dougal | A01K 97/10 211/70.8 |
| 6,918,624 B2* | 7/2005 | Miller | B60P 3/40 182/127 |
| 6,966,596 B1* | 11/2005 | Rinehart | B62D 33/0273 296/180.5 |
| 6,988,756 B1* | 1/2006 | Meinke | B60P 3/40 296/26.08 |
| 6,994,363 B2* | 2/2006 | Seksaria | B62D 33/0273 280/166 |
| 7,090,276 B1* | 8/2006 | Bruford | B62D 33/0273 296/1.02 |
| 7,234,749 B1* | 6/2007 | Firzlaff | B62D 33/0273 296/26.08 |
| 7,287,798 B2* | 10/2007 | King | B60P 3/40 296/180.1 |
| 7,334,593 B2 | 2/2008 | Avery | |
| 7,389,739 B1* | 6/2008 | Smith | B60J 5/108 116/28 R |
| 7,549,692 B2* | 6/2009 | Washington | B60P 1/435 296/61 |
| 7,681,768 B2* | 3/2010 | Gates | B60R 11/00 224/401 |
| 7,712,811 B2* | 5/2010 | Heaman | B62D 33/0273 296/26.08 |
| 7,905,532 B2 | 3/2011 | Johnson | |
| 8,348,325 B2 | 1/2013 | Hausler et al. | |
| 8,459,516 B2* | 6/2013 | O'Regan | B60R 5/04 224/402 |
| 8,820,573 B2* | 9/2014 | Tsuzuki | B60R 11/0235 220/264 |
| 8,919,853 B2* | 12/2014 | Krishnan | B60R 3/02 280/164.1 |
| 2003/0221305 A1* | 12/2003 | Burg | B62D 33/0273 29/407.1 |
| 2005/0127122 A1* | 6/2005 | McKenzie | B60R 11/00 224/547 |
| 2005/0275241 A1* | 12/2005 | Rothwell | B60R 11/00 296/136.01 |
| 2006/0027514 A1* | 2/2006 | Carlson | A47B 43/00 211/72 |
| 2007/0075212 A1* | 4/2007 | Gates | B60R 11/00 248/534 |
| 2009/0039231 A1* | 2/2009 | McLaughlin | A01K 97/08 248/535 |
| 2011/0204109 A1 | 8/2011 | Knutson et al. | |
| 2012/0139281 A1* | 6/2012 | Cousino | B62D 33/0273 296/61 |
| 2012/0227305 A1 | 9/2012 | Fontenot et al. | |
| 2014/0346206 A1 | 11/2014 | McKnight et al. | |
| 2015/0336622 A1* | 11/2015 | Worden | B62D 33/0273 280/163 |
| 2016/0236625 A1* | 8/2016 | Kogut | B60R 11/00 |
| 2016/0243997 A1* | 8/2016 | Sheehan | B60R 9/08 |

* cited by examiner

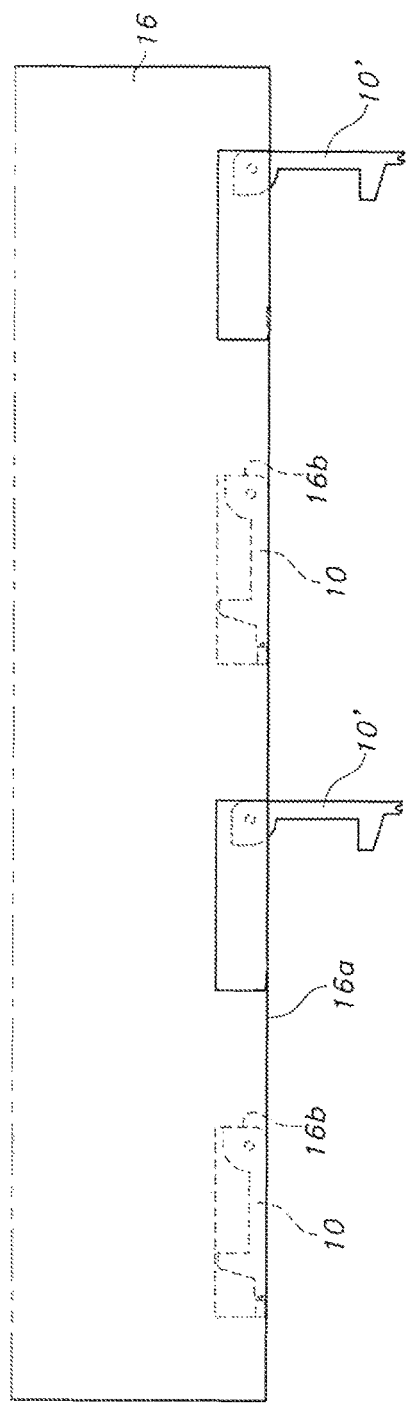
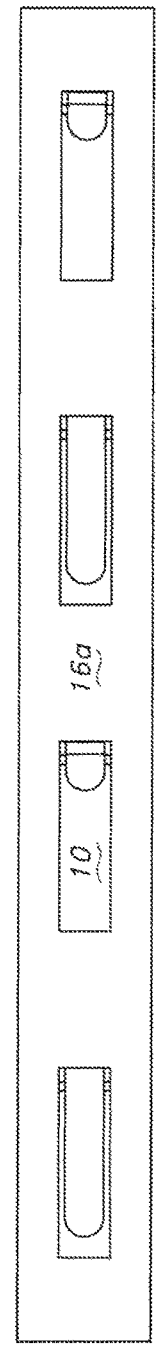
FIG. 2
FIG. 3

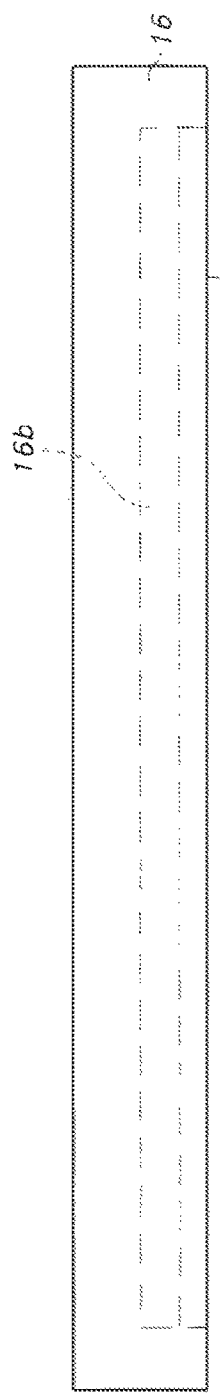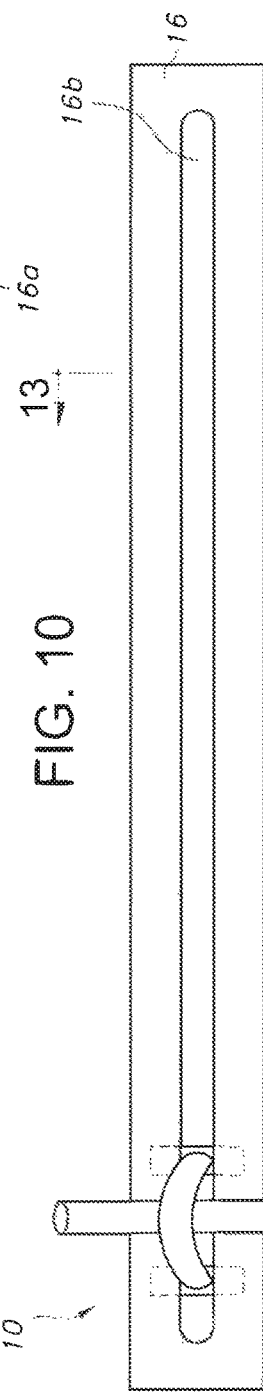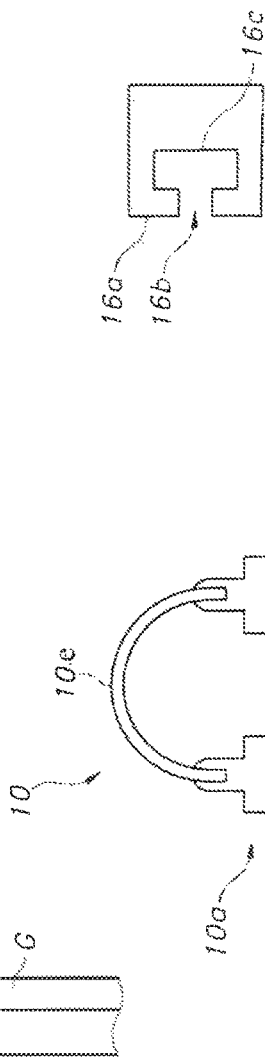

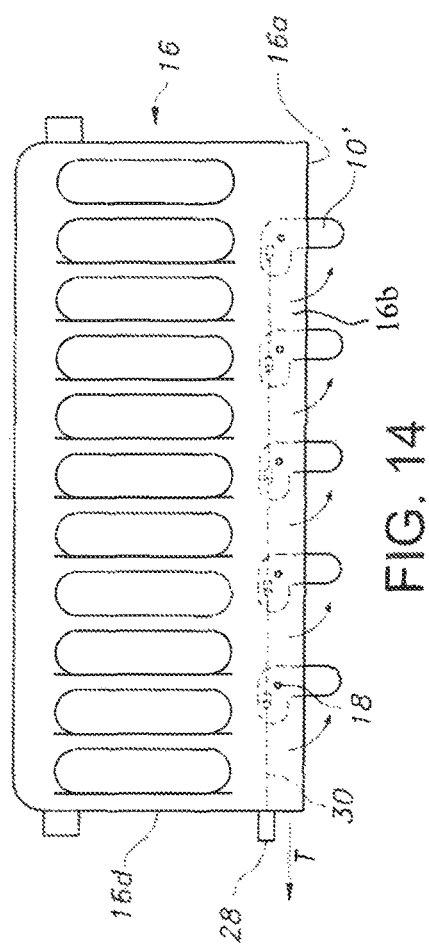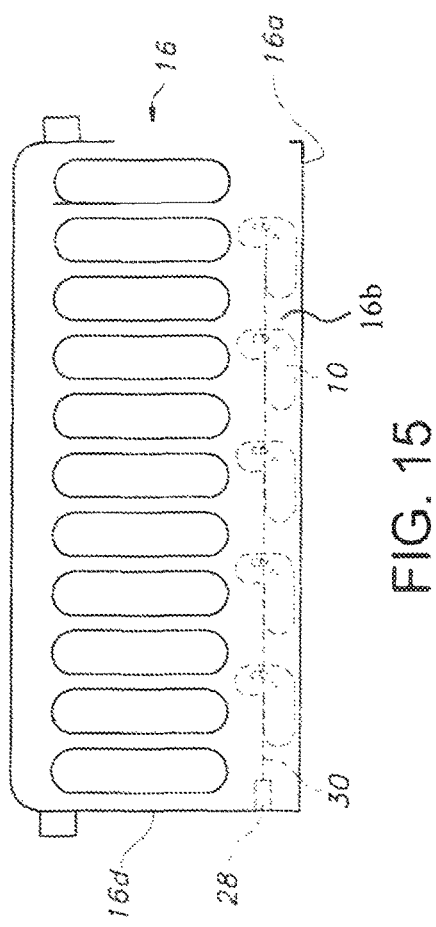

ADJUSTABLE SUPPORT FOR A VEHICLE

TECHNICAL FIELD

This document relates generally to the vehicle arts and, more particularly, to an adjustable support for supporting one or more objects resting on a vehicle, such as for example along a tailgate thereof in the case of a pickup truck.

BACKGROUND

Utility vehicles such as pickup trucks typically include a bed that may be used for the storage of various objects, which may be associated with a tailgate that may be raised or lowered. In the lowered position, it is possible to place an object, such as a tool, gun, fishing pole, or the like, resting upright on the ground against the end wall of the tailgate. In this position, the object is supported for ready access by an adjacent person.

The end wall of the tailgate tends to have a smooth, painted outer surface with rounded edges, and objects such as those mentioned above tend to be irregularly shaped, asymmetrically balanced, and also provided with smooth contact surfaces. Consequently, little assurance exists that the object will remain in place when positioned along it. Indeed, such objects tend to slide and fall to the ground unless precisely positioned, especially if the tailgate or the object is slippery or wet (as is often the case for a fishing pole, or the tailgate as the result of rain or morning dew). Aside from the inconvenience associated with balancing the object in the first place or picking it up later, the fall could result in damage to the object.

This document relates to an adjustable support, such as may be associated with a tailgate or a pickup bed or a vehicle bumper. The support would provide for convenient storage and ready access to the supported items when actuated, yet be easily removed or stowed so as to not interfere with the normal use of the tailgate or bumper.

SUMMARY

In accordance with the purposes and benefits described herein an apparatus for supporting an object in connection with a vehicle is provided. In one embodiment, the apparatus comprises a tailgate adapted for being raised and lowered relative to the vehicle. The tailgate includes a recess adapted for at least partially receiving at least one support. The support has an active condition projecting from the recess for engaging and supporting the object and an inactive condition.

In some embodiments, the tailgate includes an end wall in a lowered condition. The recess may be formed in the end wall of the tailgate such that the support is substantially flush with a surface of the end wall in the inactive condition. The recess may comprise an elongated slot for receiving a base of the support. The base may comprise a key and the recess a keyway for receiving the key so as to capture the base, yet allow for it to be easily removed if desired. The support may further comprise a partial loop connected to the base, which loop may capture the object being supported.

The support may be associated with a retainer for retaining the support in the inactive condition. The support may be associated with an actuator for urging the support toward the active condition, or for holding he support in the inactive condition. The support may be mounted for pivoting movement, and adapted to form a gap for receiving a finger for use in moving the support to the active condition.

A plurality of supports may be provided. Each support may have an active condition for engaging and supporting the object and an inactive condition. In such case, a common actuator may be provided for actuating each of the plurality of supports.

A further aspect of the disclosure pertains to an apparatus for supporting one or more objects in connection with a vehicle. The apparatus may comprise a tailgate adapted for being connected to the vehicle for moving between a raised and lowered position. The tailgate includes a support pivotally mounted for moving between an active condition projecting from the tailgate for engaging and supporting the one or more objects and an inactive condition, such as within a recess formed in an end wall of the tailgate.

In some embodiments, at least one of the supports is removable. Additionally or alternatively, each support may be retractable within a recess of an end portion of the tailgate. Each support may be retained in the recess by a retainer, and biased so as to assume the active condition upon release of the retainer.

Still a further aspect of the disclosure pertains to an apparatus for support an object from a vehicle exterior. The apparatus comprises a cover adapted for connecting to the vehicle exterior, the cover having a wall including a recess for at least partially receiving a support. The support has an active condition projecting outwardly from the wall for engaging and supporting the object, and an inactive condition in which the support does not project from the wall an amount sufficient to support the object. The cover may comprise a tailgate.

In the following description, there are shown and described several preferred embodiments of the adjustable support for use in connection with a body associated with a vehicle, such as a tailgate. As should be realized, the support is capable of other, different embodiments and its several details are capable of modification in various, obvious aspects all without departing from the support as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification illustrate several aspects of the adjustable support and together with the description serve to explain certain principles thereof.

FIG. 1 is a cutaway perspective view of a vehicle with a exterior cover, such as a lowered tailgate, including a plurality of adjustable supports for supporting objects;

FIGS. 2, 3, 4, and 5 illustrate one embodiment of a tailgate including adjustable supports;

FIGS. 6, 7, 8, and 9 illustrate another embodiment of a tailgate including adjustable supports;

FIGS. 10, 11, 12, and 13 illustrate yet another embodiment of a tailgate including adjustable supports; and FIGS. 14 and 15 illustrate still a further embodiment of a tailgate including adjustable supports.

Reference will now be made in detail to the present preferred embodiments of the adjustable support of the disclosure, examples of which are illustrated in the accompanying drawing figures.

DETAILED DESCRIPTION

Reference is now made to FIG. 1, which illustrates an adjustable support 10 for a vehicle 12 with a bed 14, such as a pickup truck. The support 10 may be provided on a cover forming an exterior part of the vehicle 12, such as a tailgate 16 for covering the vehicle bed 14, but the cover could take other forms as well (such as a front or rear bumper of the vehicle 12). The tailgate 16 as illustrated bounds one end of the bed 14, and is adapted for being raised and lowered (note action arrow A), such as to provide additional access to the bed 14 from the rear (that is, opposite the direction of vehicle travel V).

In the lowered condition of the tailgate 16, as shown in FIG. 1, it can be understood that the support 10 in an active condition projects from an end wall 16*a*. In this position, it can be appreciated that the support 10 may provide support for a resting object (such as for example a gun G, a fishing pole F, a tool (not shown) or the like), and thus the support serves as a rest. In a simple form, as shown in FIG. 1, the support 10 comprises an elongated, finger-like projection that, when active, extends generally orthogonal to a face of the end wall 16*a*. However, the support 10 may take any particular shape or form desired, as long as the desired reliable support for the object is provided.

As can be appreciated, one support 10 may provide support for multiple objects, such as along each side, or a separate support may be provided for each object, as illustrated. In addition to contacting the support(s) 10, the objects may also make contact with the rear surface of the tailgate end wall 16*a*, with the associated support thus preventing sliding movement of the objects in the transverse direction T. Yet, when inactive, such as by being adjusted as discussed below, the support 10 does not project from the end wall 16*a* in a manner sufficient to support an object, or otherwise interfere with the normal use of the tailgate 16.

Adjustability of the support(s) 10 to achieve the active or inactive conditions may be accomplished in a variety of manners. With reference to FIGS. 2 and 3, it can be appreciated that a recess 16*b* may be provided in the end wall 16*a* of the tailgate 16 for receiving the support 10 in the inactive or withdrawn condition (four such supports are shown in FIG. 2, but any number may be provided). As can be appreciated, in the inactive condition, the recess 16*b* may receive the support 10 such that it is completely recessed and thus substantially flush with a top face of the end wall 16*a*. In the active condition, the support 10 is moved to a position (10') such that it projects from the recess 16*b*, such as in a direction generally perpendicular to the face of the end wall 16*a*.

To facilitate the movement, the support 10 may include a base 10*a* with one end adapted for receiving a connector, such as a pin 18, about which the support may pivot between the inactive (or recessed) and the active conditions. The pin 18 may be secured to portions of the end wall 16*a* adjacent to the recess 16*b*. As perhaps best understood from FIGS. 3 and 4 together, tactile (finger) engagement of the support 10 may be enhanced by providing a cutout 10*b* adapted for receiving a finger or the like, which may be used to engage and pop the support from the inactive to the active condition.

An optional assist for holding the support 10 in the active or inactive condition may be provided. In one example, with reference to FIG. 5, this assist may be provided by a spring 20, such as for example a torsion spring associated with pin 18, and having legs 20*a*, 20*b* that engage the support 10 and a surface of the tailgate 16 within the recess 16*b*, respectively. The spring 20 may be arranged for biasing the support 10 toward the active condition (but could also be reversed to bias it toward the inactive condition, and a retainer 10*c* (such as a pin biased toward the support and having a force that can be overcome by depressing the support) for holding the support in the active condition).

Thus, for example, a catch or frictional engagement may serve to retain the support 10 in the recess 16*b*. Any retaining force may be overcome by finger action to lift the support from the recess. The biasing force provided by spring 20 urges the support 10 toward the active or fully erect condition. When not in use, the support 10 may be returned to the recess 16*b* by overcoming the biasing force.

A further embodiment is shown in FIGS. 6-9. In this embodiment, the support 10 is again positioned in recess 16*b* in an inactive condition, and mounted for pivoting, such as about a hinge 22 (see FIG. 9). A button 24 having a limited range of pivoting movement may be provided in the recess 16*b* to capture and retain the support 10 in the inactive condition, such as by a wedging action. A spring 26 may also be provided for biasing the support 10 toward the active condition (and, in which condition, the support may be held as a result of the inherent friction of the hinge 22). The button 24 may be arranged to pivot about a mount 24*a*, and may be held in the home position by catches 24*b*, the holding force of which is overcome by pressing on the button in a manner to cause it to pivot, as shown.

Thus, when the button 24 is moved to release the engagement with the support 10 (see arrow B), the spring 26 urges the support to move toward the active condition (arrow C). As can be understood from FIGS. 6 and 7, both the button 24 and support 10 may be fully recessed within the tailgate end wall 16*a*, and thus avoid interfering with the normal operation of the tailgate 16. Again, while five supports 10 are shown in FIGS. 6-9, any number may be provided. Also, the button 24 may be arranged for sliding, rather than pivoting movement.

FIGS. 10-13 relate to a support 10 that includes a base 10*a* connected to a support, such as a flexible strap in the form of a half loop 10*e* (but which support could also take the form of a rigid hook for projecting from the base 10*a*). Together, the base 10*a* and a partial (half) loop 10*e* support an object adjacent to the tailgate 16 serving as the body associated with the vehicle 12 in the illustrated embodiments. As can be appreciated, the loop 10*e* advantageously surrounds and thus captures the object against movement in both a direction opposite the travel direction V and the transverse direction T.

As can be further appreciated from FIG. 12, the base 10*a* may comprise a pair of keys 10*d* adapted to be inserted into a recess 16*b* in the form of elongated slot extending along in the end wall 16*a* of the tailgate 16. As can be understood from FIG. 13, which is a cross-section taken along line 13-13 of FIG. 11, the recess 16*b* is shaped to form a keyway 16*c* for receiving and capturing the keys 10*d* of the base 10*a*, while allowing the loop 10*e* to project outwardly from the end wall 16*a* when in an active condition (that is, when associated with the slot 16*c*). One or both of the base 10*a* or the edges of the recess 16*b* may be made of a flexible material to allow for the easy insertion and removal of the support 10. The recess 16*b* may be provided as part of a cap or cover adapted for being secured to or over an existing end wall 16*a* of the tailgate 16, thus allowing for an easy retrofit situation.

The modular nature of the support 10 in this embodiment allows for it to be repositioned along the tailgate 16 as desired, and also to be arranged such that the object (such as gun G) to be held is captured within the loop 10*e*, as shown in FIG. 11, and thus further reducing the risk of it falling to the ground as the result of unintended engagement, yet release of the support 10 may be easily achieved. This arrangement also allows for any number of supports 10 to be provided along the end wall 16*a* at the desire of the user. The supports 10 may also be removed when not in use, thus allowing for normal use of the tailgate 16 without added interference (or possibly left in place, given the flexible nature of the loop 10*e*).

While the above embodiments contemplate individual manipulation of the support 10 to achieve the active condition, a common actuator may be provided. Thus, as shown in FIG. 14, a plurality of supports 10 may be provided in one or more recesses 16*b* in the end wall 16*a*, and may be mounted for pivoting movement between a recessed or inactive condition (10, FIG. 15) and the erect or active condition (10', FIG. 14). An actuator, such as a handle 28, may be recessed in and substantially flush with a sidewall 16*d* of the tailgate 16, such as it does not interfere with the opening and closing. The handle 28 may be attached to or form part of a linkage, such as an elongated rod 30, interconnecting each support 10 (which is shown as an L-shaped structure, with a first portion for projecting from the end wall 16*a*, a second portion for connecting to the linkage, and an intermediate portion for connecting with a connector, such as pin 18, for allowing relative pivoting movement).

When the tailgate 16 is in the lowered position, moving the handle in the transverse direction T, such as by pulling on it, thus causes the supports 10 to collectively assume the active condition (10', FIG. 14). Reversing the position of the handle 28, such as by pushing it to the home position, thus retracts the supports 10 (FIG. 15). As can be appreciated, this arrangement allows for the simultaneous or near-simultaneous activation and retraction of the supports 10 with a simple manual action. Of course, the operation could also be reversed, such that pushing the handle 28 activates the supports 10, and also different actuators could be provided for different supports.

The support 10 and other components may be made of materials that are resistant to weather conditions, given the potential constant exposure to such in use. For instance, plastic materials may be used to form the support 10. Furthermore, as noted above, the end wall 16*a* of the tailgate 16 may comprise a plastic cover for an underlying tailgate body, which cover would include the recess(es) 16*b*. As can be appreciated, this arrangement would advantageously allow for a retrofit situation.

In summary, an adjustable support 10 is provided for supporting one or more objects from a vehicle 12, such as along the end wall of a lowered tailgate 16, or perhaps even along a face of a vehicle bumper (front or rear). The support 10 may be retracted within a recess 16*b* of the tailgate 16 when inactive, and thus does not interfere with the normal operation. When ready, the support 10 would provide reliable support for any object resting on the ground, such as a gun, fishing pole, tool, or the like.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. An apparatus for supporting an object from a vehicle, comprising:
    a tailgate adapted for being raised and lowered relative to the vehicle, the tailgate including a recess and at least one support mounted for pivoting outwardly from an inactive condition within the recess and not projecting from the tailgate for supporting the object to an active condition projecting from the recess for engaging and supporting the object.

2. The apparatus of claim 1, wherein the tailgate includes an end wall in a lowered condition, and the recess is formed in the end wall of the tailgate such that the support is substantially flush with a surface of the end wall in the inactive condition and pivots outwardly from the substantially flush condition to the active condition projecting outwardly from the end wall of the tailgate.

3. The apparatus of claim 1, wherein the recess comprises an elongated slot formed along an endwall of the tailgate for receiving a base of the support in both the active and inactive conditions.

4. The apparatus of claim 1, wherein the support is associated with a retainer for retaining the support in the inactive condition.

5. The apparatus of claim 1, wherein the support is associated with an actuator for urging the support toward the active condition.

6. The apparatus of claim 1, wherein the support is associated with an actuator for holding the support in the inactive condition.

7. The apparatus of claim 1, wherein the support is mounted for pivoting movement, and adapted to form a gap for receiving a finger for moving the support to the active condition.

8. A vehicle including the tailgate of claim 1.

9. The apparatus of claim 1, further including a plurality of supports, each having an active condition for engaging and supporting the object and an inactive condition.

10. The apparatus of claim 9, further including a common actuator for actuating each of the plurality of supports.

11. An apparatus for supporting one or more objects from a vehicle, comprising:
    a tailgate adapted for being connected to the vehicle for moving between a raised and lowered position, the tailgate including a plurality of supports mounted for pivoting movement between an active condition projecting from the tailgate for engaging and supporting the one or more objects and an inactive condition.

12. A vehicle including the apparatus of claim 11.

13. The apparatus of claim 11, further including a common actuator for actuating the plurality of supports.

14. The apparatus of claim 11, wherein each support is retractable within a recess of an end portion of the tailgate.

15. The apparatus of claim 14, wherein each support is retained in the recess by a retainer, and biased so as to assume the active condition upon release of the retainer.

16. An apparatus for supporting an object from a vehicle exterior, comprising:
    a cover adapted for connecting to the vehicle exterior, the cover including a recess; and
    a support connected to the cover, the support mounted for pivoting outwardly from a recessed position within the recess to an active condition projecting from the recess for engaging and supporting the object, and returning to an inactive condition within the recess such that the support does not project therefrom an amount sufficient to support the object.

17. The apparatus of claim 16, wherein the cover comprises a tailgate.

18. A vehicle including the apparatus of claim 16.

19. An apparatus for supporting an object from a vehicle, comprising:

a tailgate adapted for being raised and lowered relative to the vehicle, the tailgate including a recess adapted for at least partially receiving at least one support having an active condition projecting from the recess for engaging and supporting the object and an inactive condition;

wherein the recess comprises an elongated slot including a keyway for receiving a base of the support comprising a key.

20. The apparatus of claim 19, wherein the support comprises a partial loop connected to the base.

* * * * *